(12) United States Patent
Saxena et al.

(10) Patent No.: US 11,403,449 B1
(45) Date of Patent: Aug. 2, 2022

(54) SYSTEMS AND METHODS FOR CONFIGURABLE SWITCHES FOR VERIFICATION IP

(71) Applicant: CADENCE DESIGN SYSTEMS, INC., San Jose, CA (US)

(72) Inventors: Samarth Saxena, Faridabad (IN); Raghav Mahajan, Noida (IN); Kanwarpreet Grewal, Noida (IN); Neetu Goel, Noida (IN); Jasleen Kaur, Janakpuri (IN); Heena Khurana, Sonipat (IN); Shradha, Bhiwani (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/246,268

(22) Filed: Apr. 30, 2021

(51) Int. Cl.
| | | |
|---|---|---|
| *G06F 30/30* | (2020.01) | |
| *G06F 30/3308* | (2020.01) | |
| *G01R 31/3183* | (2006.01) | |
| *G06F 30/333* | (2020.01) | |
| *G06F 30/331* | (2020.01) | |
| G06F 115/02 | (2020.01) | |
| G06F 115/06 | (2020.01) | |
| G06F 115/08 | (2020.01) | |

(52) U.S. Cl.
CPC . *G06F 30/3308* (2020.01); *G01R 31/318357* (2013.01); *G06F 30/331* (2020.01); *G06F 30/333* (2020.01); *G06F 2115/02* (2020.01); *G06F 2115/06* (2020.01); *G06F 2115/08* (2020.01)

(58) Field of Classification Search
None
See application file for complete search history.

(56) References Cited

U.S. PATENT DOCUMENTS

| | | | | |
|---|---|---|---|---|
| 7,822,909 B2* | 10/2010 | Brunot | ................. | G06F 30/331 |
| | | | | 710/317 |
| 10,198,538 B1* | 2/2019 | Quayle | ................. | G06F 30/331 |
| 10,387,356 B1* | 8/2019 | Frick | .................. | H04L 12/4625 |
| 2020/0327041 A1* | 10/2020 | Shayevitz | ........... | G06F 11/3692 |

* cited by examiner

*Primary Examiner* — Leigh M Garbowski
(74) *Attorney, Agent, or Firm* — Foley & Lardner LLP

(57) ABSTRACT

An emulator system and a method for emulating functionalities of an integrated circuit design are disclosed. In one aspect, the system includes a plurality of verification components each comprising circuitry configured to perform transactions with at least another verification component. The system can include a plurality of proxies, each executing on a processor and corresponding to a respective one of the verification components. The system can include a switch that is communicatively coupled with the proxies, the switch dynamically configurable to, in a first time duration, operate with a first subset of the proxies to enable a first transaction between a functional module of the design and a first verification component. The switch can be dynamically configurable to, in a second time duration, operate with a second subset of the proxies to enable a second transaction between the functional module and a second verification component.

20 Claims, 10 Drawing Sheets

SYSTEMS AND METHODS FOR CONFIGURABLE SWITCHES FOR VERIFICATION IP

TECHNICAL FIELD

The present disclosure generally relates to systems and methods for implementing configurable switches in emulation, including but not limited to dynamically reconfiguring a switch in emulation by (re)connecting one or more verification components.

BACKGROUND

Verification is an integral aspect of developing electronic circuits and circuit boards. When testing a functional design, it is helpful to be able to test the design's connections and communications with other components in hardware so that the designer can validate that the functional design can work and meet technical standards. However, implementing different connections with other components in an emulation system is often time-consuming and resource-intensive.

SUMMARY

The present embodiments relate to an emulation system that can emulate functionalities of an integrated circuit (IC) design using switches. Typical emulation environments are able to test only limited functionalities of interface protocols such as peripheral component interconnect express (PCIe) because designing a switch can be difficult and time-consuming. For PCIe, if the design under test (DUT) is a root complex (RC) component, a typical emulation system may connect the DUT with one endpoint (EP) component. On the other hand, if the DUT is an EP component, the DUT may be connected to one RC component. However, it may be desirable for a DUT that is an RC component to communicate (e.g., be tested/verified) with multiple EP components, or for a DUT that is an EP component to communicate with another EP component. The systems and methods disclosed herein can use a software approach to dynamically configure a switch that can connect multiple RC components and multiple EP components together along with a DUT which allows the user to test the DUT's functionality in a more flexible, efficient and/or significant way.

According to some aspects, embodiments relate to an emulator system configured to emulate functionalities of an integrated circuit design. The emulator system can include at least one processor and a plurality of verification components each comprising circuitry configured to perform transactions with at least another one of the verification components. The emulation system can include a plurality of proxies, each executing on the at least one processor and corresponding to a respective one of the verification components. The emulation system can include a switch executing on the at least one processor and communicatively coupled with the proxies. The switch may be dynamically configurable to, in a first time duration, operate with a first subset of the proxies to enable a first transaction between a functional module of the integrated circuit design and a first one of the verification components. The switch can be dynamically configurable to, in a second time duration, operate with a second subset of the proxies to enable a second transaction between the functional module and a second one of the verification components.

The plurality of verification components can include a first subset of verification components each of a first type, and a second subset of verification components each of a second type. The first or second transaction can be enabled via: a third verification component of the second type, the switch and a fourth verification component of the first type.

The first or second transaction can be enabled via: a third verification component of the second type, the switch, a fourth verification component of the first type, the switch, and a fifth verification component of the first type. Or the first or second transaction can be enabled via: a third verification component of the second type, the switch and a fourth verification component of the second type. Or the first or second transaction can be enabled via the switch. The first or second transaction can be directly between the functional module and the first or second verification component.

The switch can include a transaction responder configured to receive a request to enable the first transaction, and output the request with switching information. The switch can include switching logic configured to receive the request and the switching information from the transaction responder, convert the request into a local write or read request, and/or transmit the local write or read request to a first proxy of the first subset of the proxies.

The emulator system can include another switch executing on the at least one processor and communicatively coupled with the switch and the proxies. The another switch can be dynamically configurable to, in a third time duration, operate with a third subset of proxies to enable a third transaction between the functional module and a third one of the verification components. The another switch can be dynamically configurable to, in a fourth time duration, operate with a fourth subset of proxies to enable a fourth transaction between the functional module and a fourth one of the verification components. The first and second verification components can each include a PCIe root complex verification component or a PCIe endpoint verification component.

According to some aspects, embodiments relate to a method for emulating functionalities of an integrated circuit design. The method can include configuring a switch that executes on at least one processor and is communicatively coupled with a plurality of proxies executing on the at least one processor. The switch can operate with a first subset of the proxies to enable a first transaction between a functional module of the integrated circuit chip design and a first one of a plurality of verification components. Each of the verification components can include circuitry configured to perform transactions with at least another one of the verification components, and each of the proxies can correspond to a respective one of the verification components. The method can include enabling, by the switch and the first subset of the proxies, in a first time duration responsive to the configuring, the first transaction between the functional module and the first one of the verification components. The method can include dynamically configuring the switch to operate with a second subset of the proxies to enable a second transaction between the functional module and a second one of the verification components. The method can include enabling, by the switch and the first subset of the proxies, in a second time duration responsive to the dynamically configuring, the second transaction between the functional module and the second one of the verification components.

The plurality of verification components can include a first subset of verification components each of a first type and a second subset of verification components each of a second type. The first and second transactions can be enabled via: a third verification component of the second type, the switch, a fourth verification component of the first type; the third verification component of the second type, the switch, and the fourth verification component of the first type, the switch, and a fifth verification component of the first type; or the third verification component of the second type, the switch, and the fourth verification component of the second type.

The method can include receiving, by a transaction responder within the switch, a request to enable the first transaction and outputting, the transaction responder, the request with switching information. The method can include receiving, by a switching logic within the switch, the request. The method can include converting, by the switching logic, the request into a local write or read request. The method can include transmitting, by the switching logic, the local write or read request to a first proxy of the first subset of proxies.

The first subset of verification components can include a first PCIe endpoint verification component. The configuring the switch can include connecting, by a configuration transaction manager, the first PCIe endpoint verification component to Type 1 configuration registers.

The first subset of verification components can include a second PCIe endpoint verification component, and the second subset of verification components can include first and second PCIe root complex verification components. The configuring the switch can include connecting the switch to the first PCIe endpoint verification component and the first PCIe root complex verification component. The enabling the first transaction can include enabling the first transaction between the functional module and the second PCIe endpoint verification component or the second PCIe root complex verification component.

The first subset of verification components can include a third PCIe endpoint verification component. The dynamically configuring can include removing, by the configuration transaction manager, the connection between the first PCIe endpoint verification component and the Type 1 configuration registers. The dynamically configuring can include connecting, by the configuration transaction manager, the third PCIe endpoint verification component to the Type 1 configuration registers. The functional module can include a first functional module and a second functional module, and the enabling the first transaction can include enabling the first transaction between the first functional module and the second functional module via the switch.

BRIEF DESCRIPTION OF THE DRAWINGS

These and other aspects and features of the present embodiments will become apparent to those ordinarily skilled in the art upon review of the following description of specific embodiments in conjunction with the accompanying figures.

DETAILED DESCRIPTION

The present embodiments shall now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments shall be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Embodiments of the systems and methods disclosed herein relate to an emulation system that can emulate functionalities of an IC design using switches. Typical emulation environments are able to test only limited functionalities of interface protocols such as PCIe because designing a switch can be difficult and time-consuming. For PCIe, if the DUT is an RC component, a typical emulation system can connect the DUT with one EP component. On the other hand, if the DUT is an EP component, the DUT can be connected (or communicatively coupled or communicatively connected) to one RC component. However, it may be beneficial to connect a DUT that is an RC component with multiple EP components, or to connect a DUT that is an EP component with another EP component for instance. Embodiments of the systems and methods disclosed herein can be used to dynamically configure/implement a switch that can connect at least one RC component and/or at least one EP component together with a DUT which allows a user to test the DUT's functionality.

Figure 1:
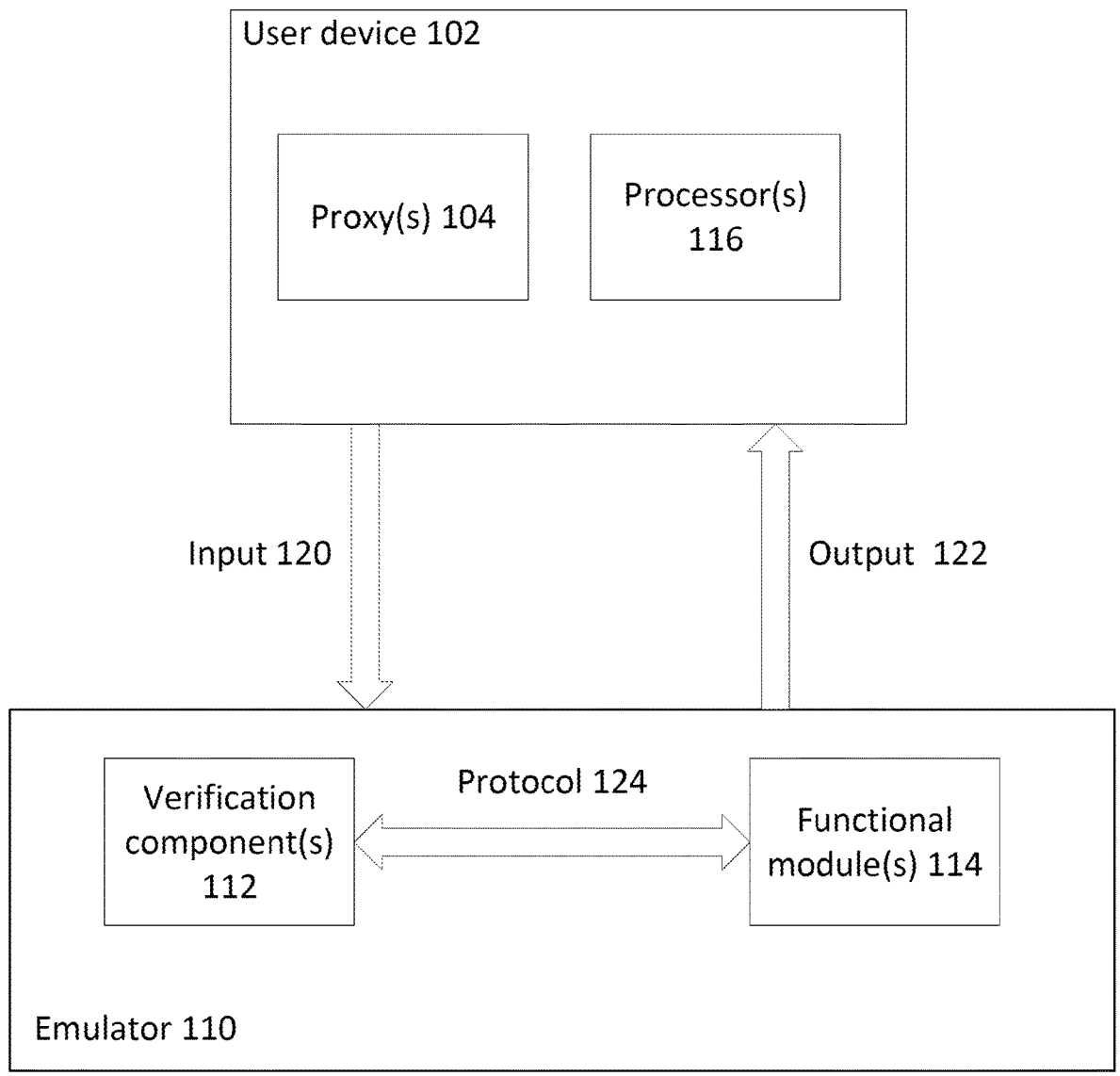
FIG. 1 is a block diagram of an emulation system, according to some embodiments.

FIG. 1 is a block diagram of an emulation environment 100, according to some embodiments. The emulation environment 100 can include a user device 102 and/or an emulator (or emulation system) 110. The user device 102 can include proxy(s) 104 and can send commands 120 to the emulator 110. The emulator 110 can include verification component(s) 112, functional module(s) (or DUT(s)) 114, and/or processor(s). The emulator 110 can provide an output 122 to the user device 102. Although the emulation environment 100 is shown to have certain number of components and connections, embodiments are not limited thereto, and the emulation environment 100 can have more or fewer components therein. Each of the components is implemented in hardware, or a combination of software and hardware (e.g., a program executing on hardware, such as a processor of the emulator and/or user device).

The user device 102 can include a computing device such as computer (or workstation) that a user can use to access the emulator 110 to test the functionality of a DUT. The user can enter/provide (e.g., type in) commands 120 into the user device 102 which may be sent to the emulator 110.

The proxy 104 can include or be part of (or be a proxy of) a software instantiation of a hardware verification component 112 so that the user is able access the verification component 112. In other words, instantiating the proxy 104 in the user device 102 allows the user to create/establish/use/access an instance of the verification component 112 and to use the instance of the verification component 112 to test the DUT. For example, a user can write software command (s) into the user device 102 to create an instance of a proxy 104, and the proxy 104 can be instantiated so that the user can access the verification components 112 (via the instance of the proxy 104) with such software (e.g., Java or C++) commands. The proxy 104 can be implemented as software executing on hardware of the emulator.

The processor(s) 116 can include a processor that executes the software command(s) that the user can input into the user device 102. The user can then have access to a verification component 112 that corresponds to the respective proxy 104. Although it is shown that the processor 116 and proxy 104 are located separately within the user device 102, embodiments are not limited thereto. For example, the proxy 104 can be instantiated within (e.g., executed on/by) the processor 116, or the proxy 104 can be instantiated within the emulator 110, and/or the processor 116 can be within the emulator 110.

The emulator 110 is sometimes referred to as an emulation system, and can perform emulation for a system-on-chip (SoC), subsystems, and/or IP blocks, to test functionalities such as data processing and/or correct implementation of a communication protocol. The emulator 110 can compile and process different test designs (e.g., import or map to a synthesized test design) to operate/communicate/interact with built-in verification components to test a functional design (or DUT) 114. The emulator 110 can include a variety of hardware components such as processor(s), field programmable gate arrays (FPGA), dedicated components such as application specific integrated circuits (ASIC), and/or other devices that can be used to run emulations of a DUT 114, e.g., to test/verify the functionality of the DUT 114.

The verification component(s) 112 can include a bus functional module (BFM) of the hardware components. Each verification component may operate, interact and/or connect with a switch via a proxy corresponding to the verification component. For example, in the user's IP library, the user may have a custom EP component that is already verified or in production. The user can instantiate the EP component for use in verification within the emulator 110 using a proxy 104. The user can test the functionality of the functional module (or DUT) 114 by connecting the DUT 114 with a verification component 112 to drive inputs into the DUT 114 and/or receive/verify corresponding outputs generated by the DUT 114 for correctness or errors.

As used/supported in the emulator 110, a protocol 124 can include the PCIe protocol by way of illustration, but is not limited thereto. For example, the protocol 124 can include any interface protocol such as serial advanced technology attachment (SATA), Interlaken, VC, RapidIO, universal serial bus (USB), Ethernet, computer express link (CXL), cache coherent interconnect for accelerators (CCIX), or any protocol that can connect two or more components to one another.

Briefly, a user can use the emulation environment 100 to test, verify and/or debug the functionality of the DUT 114. In testing the DUT 114 using the PCIe protocol, for example, the user can instantiate a switch (not shown) and one or more proxies 104 to create a switch structure. The switch structure can be used to test the DUT 114 as an RC component or an EP component. The DUT 114 can be tested against one or more verification components 112, that can also be other functional designs or built-in verification components from a standard verification library, for example.

Figure 2A:
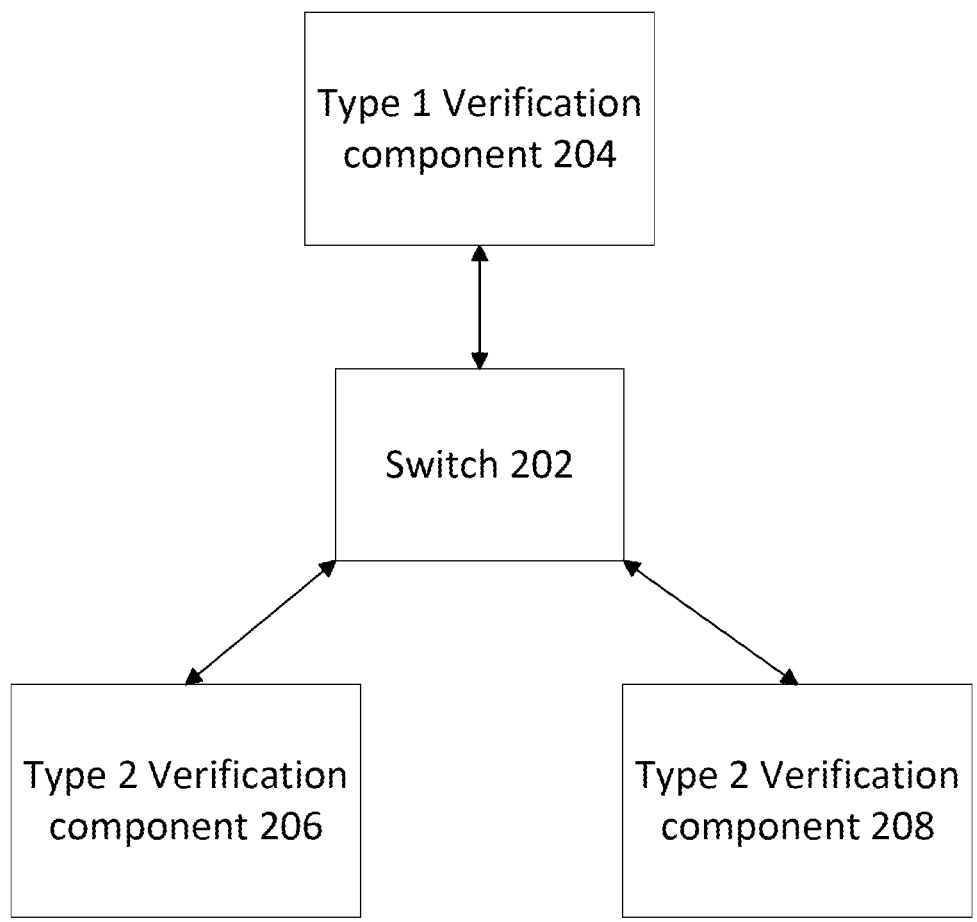
FIG. 2A is a block diagram of a switch structure, according to some embodiments.

FIG. 2A is a block diagram of a switch structure 200, according to some embodiments. The switch structure can include a switch 202 and/or verification components 204, 206 and/or 208. Although the switch structure of FIG. 2A shows four components (i.e., the switch 202, and the verification components 204, 206, and 208), embodiments are not limited thereto, and more or fewer components can be included in the switch structure 200. For example, for the PCIe protocol, the switch 202 can be connected to up to 32 verification components of type 1 (EP components), which is the maximum allowed by the PCIe standard. In this example, the switch 202 can be connected to 32 verification components of type 2 type (RC components) which can connect to 32 EP components.

The verification component 204 can include an EP component, and each of the verification components 206 and 208 can include an RC component. Although not shown in FIG. 2A, each of the verification components 204, 206 and 208 can be connected to other verification components.

The switch 202 can be implemented in software and hardware (e.g., software executing on at least one processor). For example, the user can enter a software command into the processor 116 to instantiate the switch 202. The user can connect the switch 202 to the verification components 204, 206 and 208 using corresponding proxies (e.g., see FIG. 3). Accordingly, the switch structure 200 can be connected between one or more RC components and one or more EP components for the PCIe protocol. In some embodiments, the verification component 204, which can include an EP component, can be connected to an RC component. In some embodiments, each of the verification components 206 and 208 can be connected to EP components. Accordingly, the switch structure 200 can function/operate as a switch between the RC component that is connected to the verification component 204 and the EP components that are connected to the verification components 206 and 208.

Figure 2B:
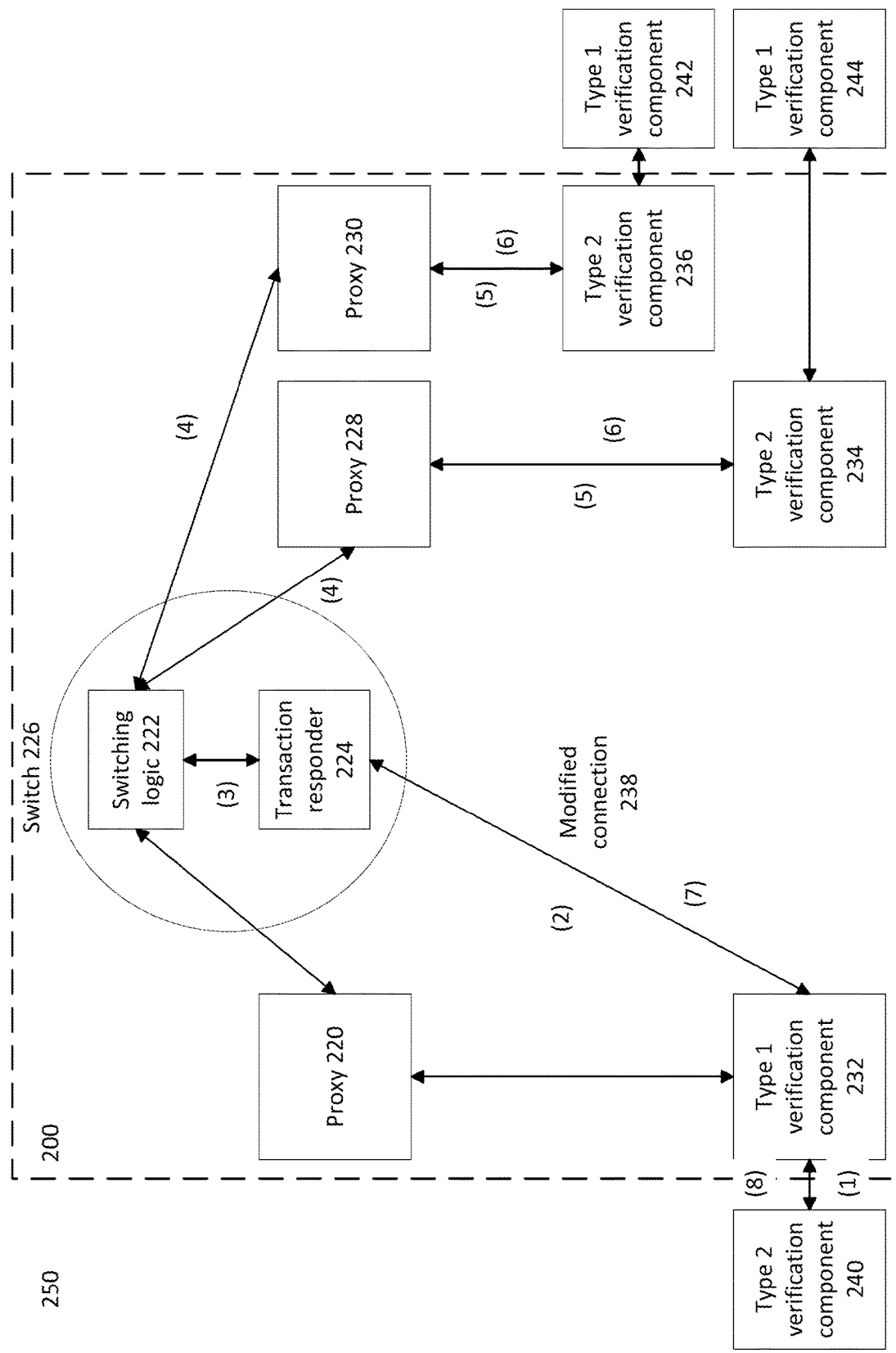
FIG. 2B is a block diagram of an emulation system with a switch structure, according to some embodiments.

FIG. 2B is a block diagram of an emulation system 250 (e.g., with a switch structure 200 of FIG. 2A), according to some embodiments. The switch structure 200 can include one or more proxies 220, 228, and 230, a switch 226, and/or one or more verification components 232, 234, and 236. The emulation system 250 can include verification components 240, 242, and 244 that are connected to the switch structure 200.

The switch 226 can include switching logic 222 and/or a transaction responder 224. The switching logic 222 can include connection(s), mapping/pointer(s), network(s) and/or mechanism(s) to connect the proxies 220, 228, and 230 to the transaction responder 224 in software. The transaction responder 224 can receive and route transaction requests/responses received from the verification components 240, 242, and/or 244. The transaction responder 224 can provide relevant information such as upstream/downstream port memory ranges to the switching logic 222.

The proxy 220 can be connected to the type 1 verification component 232 and/or the switch 226. The proxy 220 can be instantiated by the user and can connect to the type 1 verification component (e.g., EP) 232, which can be connected to the type 2 verification component (e.g., RC) 240. Accordingly, when the user wants to test the user's functional design as an RC component, the user can replace the RC 240 with the DUT and can test/check the functionality of the DUT against the verification components (e.g., EPs) 242 and 244 using the switch structure 200.

When the verification component 240 includes the DUT as an RC component, the user can initiate a write or read transaction from the DUT or respond to a write and/or read transaction request from an EP component such as the verification component 242 or 244. The Type 1 transaction can be transmitted to the verification component 232 (1) which can route/direct the transaction to the transaction responder 224 (2). Then, the transaction responder 224 can forward relevant information such as data to be written/read and the destination EP component port information to the switching logic 222 (3). Then, the switching logic 222 can convert/translate the transaction into a local management write command or a local management read command and send the command to the proxy 228 or 230, depending on the destination of the write or read command (4). The proxy 228 or 230 can configure the registers of the verification component 234 or 236, which can include RC components, using a local management bus (5). Then the proxy 228 or 230 can send the command to the verification component 234 or 236 which can then send the command to the verification component 242 or 244, respectively. The verification component 234 or 236 can generate a callback to the proxy 228 or 230, identifying its port number (6). Upon receiving the callback, the switching logic 222 can generate a completion indication which can be sent through the transaction responder 224 to the verification component 232 (7). Then the completion can be sent to the verification component 240 which can include an RC component (8).

The proxy 228 can be connected to the verification component 234 and/or the switch 226. The proxy 228 can be instantiated by the user and can connect to the type 2 verification component (e.g., RC) 234, which can be connected to the type 1 verification component (e.g., EP) 244. Accordingly, when the user intends to test the user's functional design as an EP component, the user can (dynamically or configurably) replace the EP 244 with the DUT and can test the functionality of the DUT against the type 2 verification component (e.g., RC) 240 and the type 1 verification component (e.g., EP) 242 using the configurable switch structure 200.

The proxy 230 can be connected to the verification component 236 and/or the switch 226. The proxy 230 can be instantiated by the user and connect to the type 2 verification component (e.g., RC) 236, which can be connected to the type 1 verification component (e.g., EP) 242. Accordingly, when the user wants to test/check the user's functional design as an EP component, the user can replace the EP 242 with the DUT and test the functionality of the DUT against the type 2 verification component (e.g., RC) 240 and the type 1 verification component (e.g., EP) 244 using the switch structure 200.

When the verification component 242 includes the DUT as an EP component, the user can respond to a write and/or read transaction request from the verification component 240 or initiate a write or read transaction from the DUT to the verification component 240 or the verification component 244. When the transaction (e.g., operation, interaction, communication) is with the verification component 240, verification component 242 can route the transaction to the switch 226 via the proxy 230. Then, the switching logic 222 can convert the transaction into a local management write command or a local management read command and can send the command to the proxy 220. Then the proxy 220 can send the command to the verification component 232 which can then send the command to the verification component 240.

When the transaction is with the verification component 244, the verification component 242 can route/direct the transaction to the switch 226 via the proxy 230. Then, the switching logic 222 can convert/translate the transaction into a local management write command or a local management read command and send the command to the proxy 230. The proxy 230 can then send the command to the verification component 236, which can then send the command to the verification component 242. The verification component 242 can then write data into the verification component.

Figure 3:
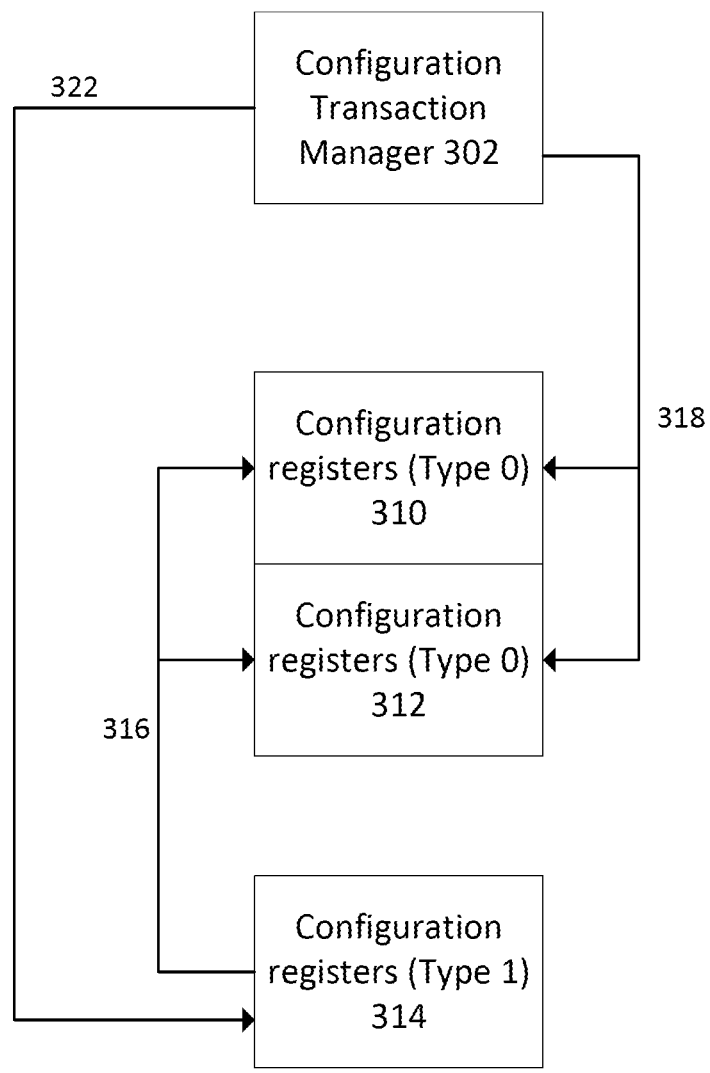
FIG. 3 is a block diagram of a configurable portion of an emulation system, according to some embodiments.

FIG. 3 is a block diagram of a configurable portion of an emulation system, according to some embodiments. The configurable portion can include a configuration transaction manager 302, configuration registers (Type 0) 310, configuration registers (Type 0) 312 and configuration registers (Type 1) 314.

A verification component can typically behave like an RC component (e.g., verification component 234 or 236) or an EP component (e.g., verification component 232). However, in some embodiments, the EP component can be modified to function like an RC component (e.g., a bridge) so that the switch can be implemented. For example, referring FIG. 3, an EP component can be modified to behave like an RC component in emulation. Configuration registers (Type 1) 314 can be added to a verification component that typically functions like an EP component. When the user instantiates a switch and a proxy associated with the EP component, the software can establish a connection 322 between the configuration transaction manager 302 and the configuration registers (Type 1) 314. A connection 316 can be severed (or disconnected) so that the verification component can behave like a bridge or an RC component, rather than an EP component. The connection 322 can expose a Type 1 header to other components so that the verification component can be seen as an RC component.

In some embodiments, the user can dynamically reconfigure the switch so that the verification component connected to the Type 1 header can be reconfigured (or restored) as an EP component. For example, if the user removes the switch or disconnects the verification component to the switch, the software can disconnect the connection 322 and establish a connection 318. Accordingly, the verification component can behave like an EP component. It should be understood that actions/commands performed by the user as disclosed herein, can be performed/provided via the use of a user device. (e.g., through a program and/or user interface of the user device).

Figures 4A, 4B:
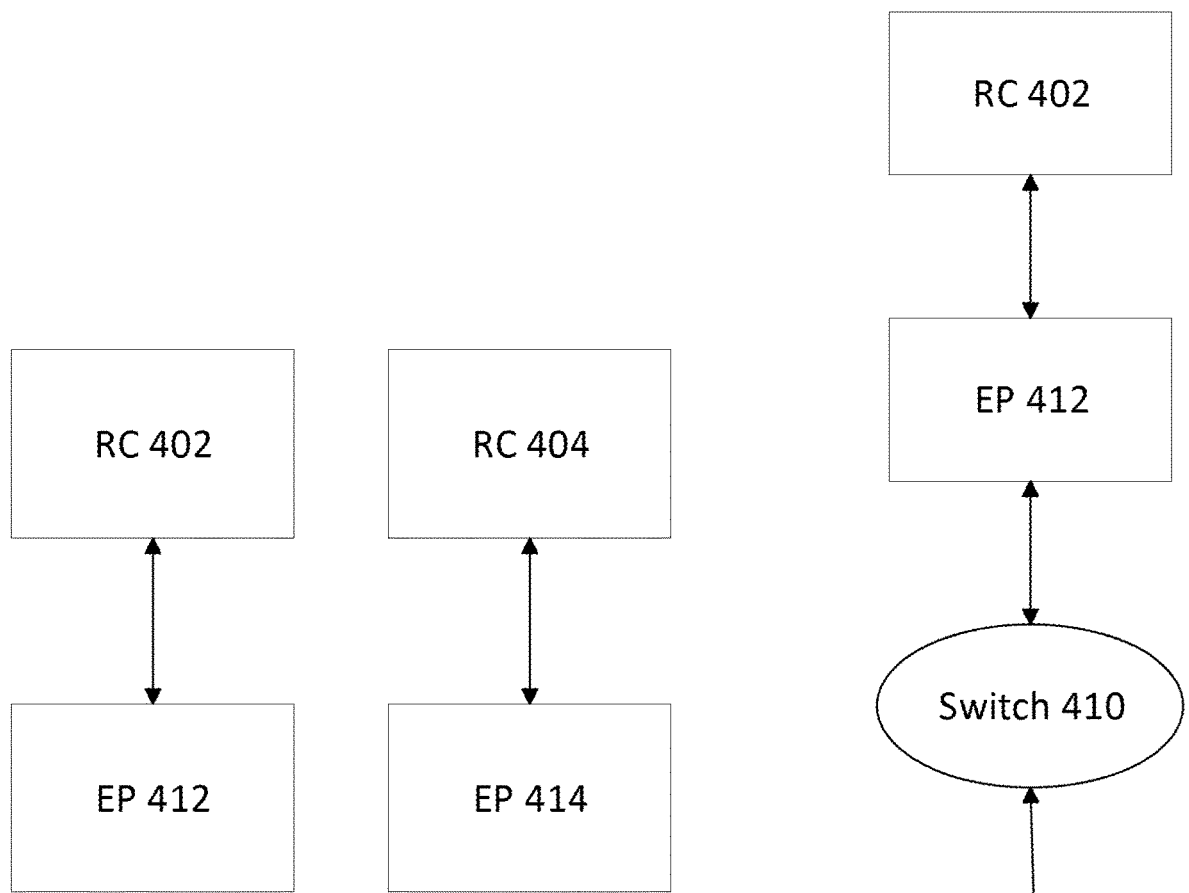
FIG. 4A is a block diagram of verification components without a switch, according to some embodiments.
FIG. 4B is a block diagram of the verification components of FIG. 4A with a switch, according to some embodiments.

FIG. 4A is a block diagram of verification components (e.g., that are not connected via a switch), according to some embodiments. The block diagram can include RCs 402 and 404 and/or EPs 412 and 414. An RC component connected to an EP component can be called an RC-EP pair.

The RC 402 can be connected to the EP 412, and the RC 404 can be connected to the EP 414. The RC 402 and EP 412 can form/establish/implement an RC-EP pair, and the RC-EP pair can form/establish/implement another RC-EP pair. The user can replace any of the verification components with the DUT. For example, when the DUT is an RC component, the DUT can replace RC 402 or RC 404, and the user can test/verify the DUT with the EP 412 or EP 414, respectively. As another example, when the DUT is an EP component, the DUT can replace the EP 412 or EP 414, and the user can test/verify the DUT with/using the RC 402 or RC 404, respectively.

FIG. 4B is a block diagram of a configuration of the verification components of FIG. 4A with a switch, according to some embodiments. The configuration can include the RC 402, the EP 412, a switch 410, the RC 404, and/or the EP 414.

From the configuration in FIG. 4A in which the RC 402 and EP 412 are not connected with the RC 404 and EP 414, the user can dynamically configure (or reconfigure) the switch 410 in software. For example, the user can instantiate the switch 410 and proxies associated with the EP 412 and the RC 404 using software commands. The software can connect the EP 412 to Type 1 configuration registers to expose the Type 1 header so that the EP 412 can behave and/or be seen like an RC component. Then the user can replace the RC 402 or the EP 414 with the DUT to test the DUT in hardware. When the DUT is an RC component (e.g., replacing RC 402), the DUT can send read or write transaction requests to the EP 414 via the EP 412, switch 410, and RC 404. When the DUT is an EP component (e.g., replacing EP 414), the DUT can send read or write transaction requests to the RC 402 via the RC 404, switch 410, and the EP 412.

If the user would like to remove the switch 410 so that the RC 402 and EP 412 are disconnected from the RC 404 and EP 414 (like, for example, the configuration in FIG. 4A), the user can enter a software command to remove EP 412's connection to the Type 1 configuration registers so that the EP 412 can behave/operate and/or be seen like an EP component. For example, when the switch is removed, the RC-EP pair including the RC 402 and EP 412 of FIG. 4B may be reconfigured as the RC-EP pair including RC 402 and RC 412 in FIG. 4A. When the switch is removed, the connection to the Type 1 configuration registers (e.g., connection 322 of FIG. 3) is removed and the EP 412 is connected to Type 0 configuration registers by establishing a connection (e.g., connection 318). Accordingly, the EP 412 can once again function like an EP component.

Figure 5A:
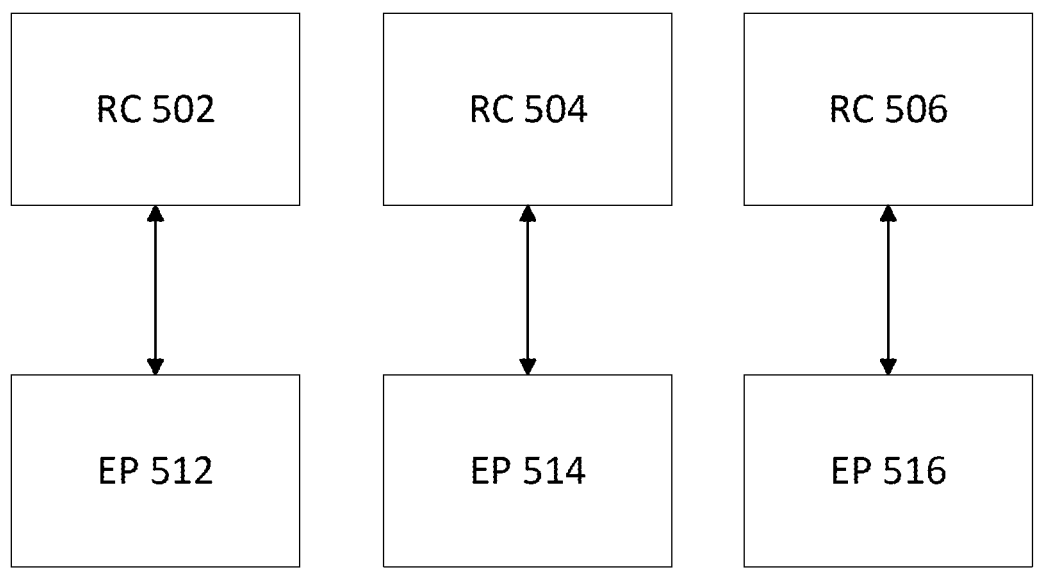
FIG. 5A is a block diagram of verification components without a switch, according to some embodiments.

FIG. 5A is a block diagram of verification components (e.g., that are not connected via a switch), according to some embodiments. The block diagram can include RCs 502, 504, and 506 and/or EPs 512, 514, and 516.

The RC 502 can be connected to the EP 512, the RC 504 can be connected to the EP 514, and the RC 506 can be connected to the EP 516. The user can replace any of the verification components with the DUT. For example, when the DUT is an RC component, the DUT can replace RC 502, RC 504, or RC 504, and the user can test the DUT with the EP 512, EP 514, or EP 516, respectively. As another example, when the DUT is an EP component, the DUT can replace the EP 512, EP 514, or EP 516, and the user can test/check/debug the DUT with the RC 502, RC 504, or RC 504, respectively.

Figure 5B:
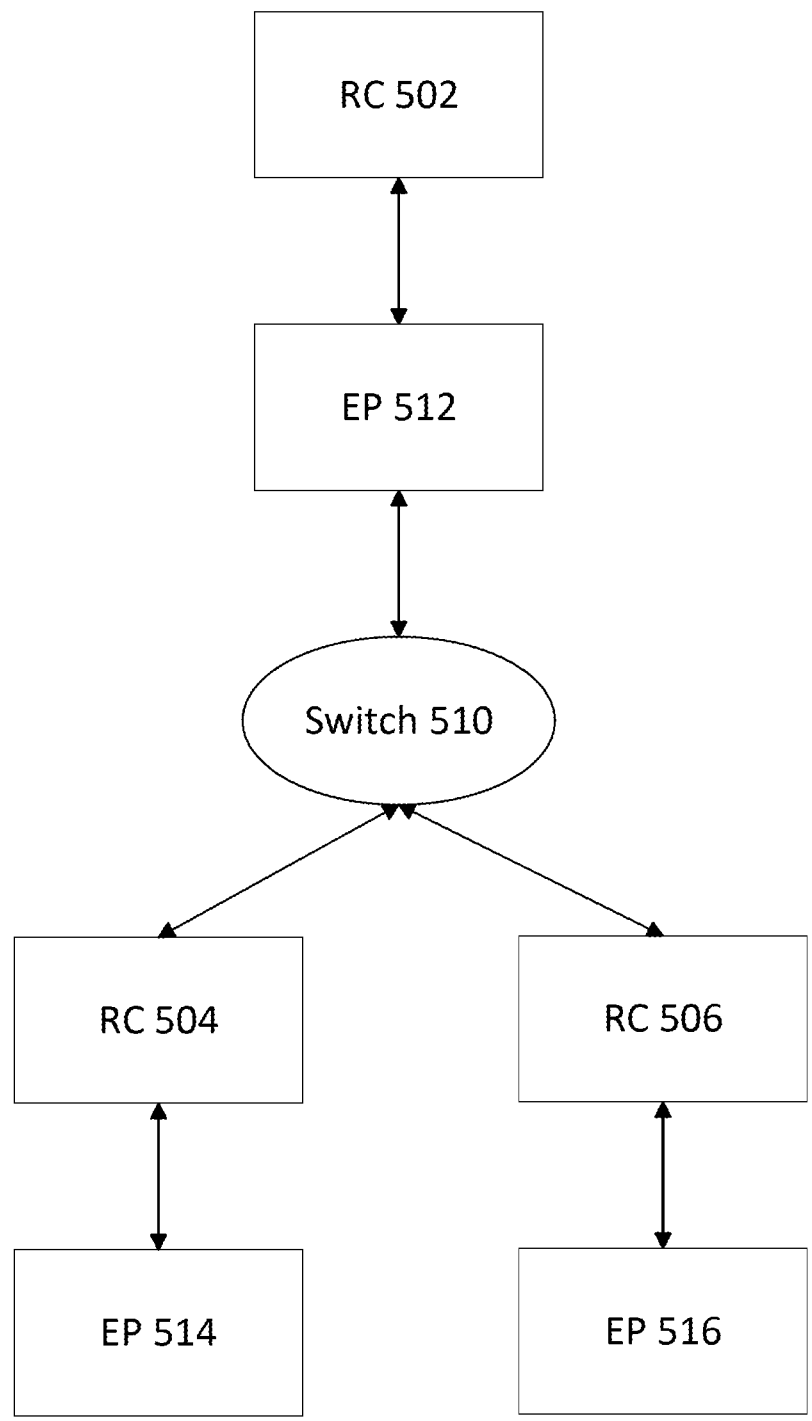
FIG. 5B is a block diagram of verification components of FIG. 5A with a switch, according to some embodiments.

FIG. 5B is a block diagram of a configuration of the verification components of FIG. 5A with a switch, according to some embodiments. The configuration can include the 502, EP 512, a switch 510, the RC 504, the EP 514, the RC 506, and/or the EP 516.

From the configuration in FIG. 5A in which the RC-EP pairs are not connected to one another, the user can dynamically configure (or reconfigure) the switch 510 in software. For example, the user can instantiate the switch 510 and proxies associated with the EP 512, RC 504, and RC 506 using software commands. The software (e.g., including the switch and/or proxies) can connect the EP 512 to Type 1 configuration registers to expose the Type 1 header so that the EP 512 will behave and/or be seen like an RC component. Then the user can replace the RC 502, EP 514 or the EP 516 with the DUT to test the DUT in hardware. For example, if the user replaces the RC 502 with the DUT, the user can send read or write transactions to the EP 514 (via the EP 512, the switch 512, and the RC 504) or the EP 516 (via EP 512, the switch 510, and the RC 506). As another example, if the user replaces the EP 514 with the DUT, the user can send a read or write transaction to the RC 502 (via the RC 504, switch 510, and the EP 512) or the EP 516 (via the RC 506, the switch 510, and the EP 512).

From the configuration of FIG. 5B, the user can dynamically reconfigure the switch 510 and remove the connections between the switch 510 and the proxies for EP 512, RC 504, and RC 506. The user can initiate (e.g., via entering a software command) removal of the switch 510 and the proxies. When the switch 510 and the proxies are removed, EP 512's connection to the Type 1 configuration registers can be severed and the EP 512 is reconnected to the Type 0 configuration registers. Accordingly, the EP 512 can function/operate and/or be seen as an EP component.

Figure 5C:
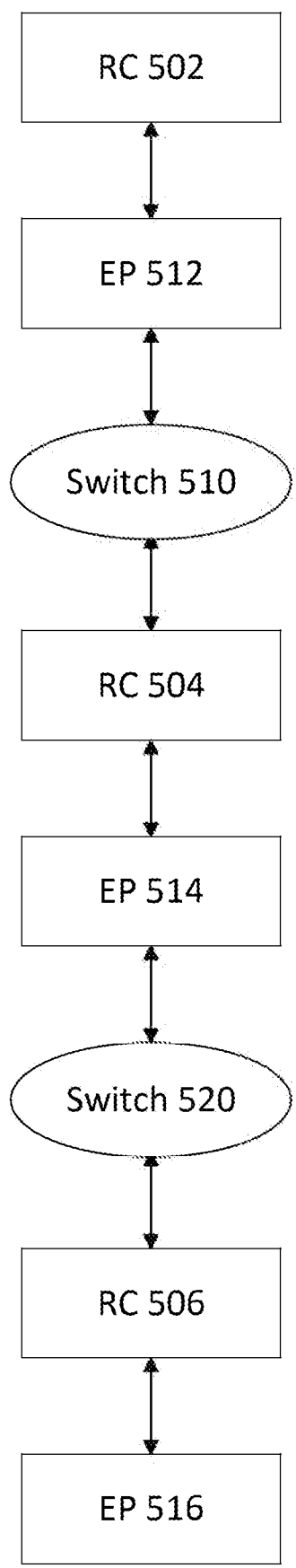
FIG. 5C is a block diagram of verification components of FIG. 5A with two switches, according to some embodiments.

FIG. 5C is a block diagram of another configuration of the verification components of FIG. 4B with two switches, according to some embodiments. The configuration can include the RC 502, the EP 512, a switch 510, the RC 504, the EP 514, a switch 520, the RC 506, and the EP 516.

The user can dynamically reconfigure the switches 510 and 520 to create the configuration of FIG. 5C. For example, the user can instantiate the switches 510 and 520 and proxies associated with the EP 512, RC 504, EP 514, and RC 506 using software commands. The software can connect the EP 512 and EP 514 to Type 1 configuration registers to expose the Type 1 header so that the EP 512 and EP 514 can behave/operate and/or be seen like RC components. Then the user can replace the RC 502 or the EP 516 with the DUT to test the DUT in hardware. For example, if the user replaces the RC 502 with the DUT, the user can send read or write transactions to the EP 516 via the EP 512, switch 510, RC 504, EP 514, switch 520, and RC 506. As another example, if the user replaces the EP 516 with the DUT, the user can send a read or write transaction to the RC 502 via the RC 506, switch 520, EP 514, RC 504, switch 510, and EP 512.

The user can dynamically reconfigure the switches 510 and 520 (e.g., without (re)synthesizing register transfer language (RTL) functionality/design, and/or without adding/replacing/programming/reprograming a FPGA/hardware) such that one or both of the switches 510 and 520 can be removed and/or reconnected into a different configuration. For example, the user can remove both the switches 510 and 520 to create the configuration of FIG. 5A in which the three RC-EP pairs not connected to one another. As another example, the user can remove the switch 520 and connect the switch 510 to the proxy for RC 506 so that the configuration is the configuration of FIG. 5B. Accordingly, the user is able to dynamically reconfigure the switches (and/or the switch structure) so that the user is not required to recompile/update a test bench, DUT and/or the verification components in hardware or into hardware representation (e.g., gate level netlist).

Figure 6:
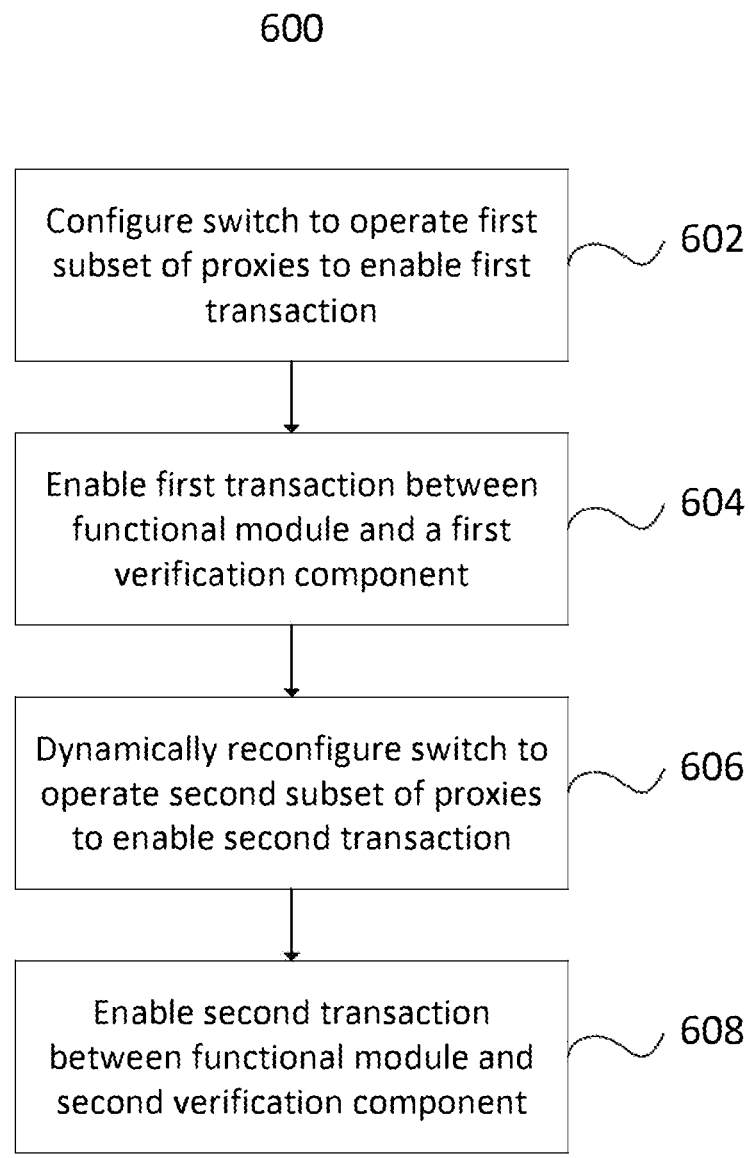
FIG. 6 is a flow chart illustrating an example method for verifying an IC design, according to some embodiments.

FIG. 6 is a flow chart illustrating an example method 600 of emulating an IC design, according to some embodiments. The method 600 can include configuring a switch, such as switch 202, 226, 410, 510, or 520, to operate a first subset of proxies to enable a first transaction (602). The method 600 can include enabling the first transaction between a functional module, such as functional module 114, and a first verification component (604). The method 600 can include dynamically reconfiguring the switch to operate a second subset of proxies to enable a second transaction (606). The method 600 can include enabling the second transaction between the functional module and a second verification component (608).

The method 600 can include configuring a switch (e.g., at a first time instance) to operate a first subset of proxies to enable a first transaction (602). As discussed with respect to FIGS. 1-3, a user can establish/create verification component(s) that is as shown in FIGS. 4A and 5A. The user can enter a software command (e.g., C++, Java, etc.) in the user device 102 to create a switch and proxies that are associated with the verification components. The first subset of verification components can be of type 1 (e.g., EP components), and the second subset of verification components can be of type 2 (RC component). The processor can modify connections of the verification components so that verification components of type 1 can function like a bridge (e.g., RC component). The modification of the connections can include establishing connections between the configuration transaction manager 302 and the Type 1 configuration registers 314. The switch, the proxies, and the verification components associated with the proxies can be grouped as a switch structure (e.g., switch structure 200). The DUT can be connected to the switch structure as either an RC component or an EP component.

The method 600 can include receiving, by the transaction responder within the switch, a request to enable the first transaction. The method 600 can include outputting, by the transaction responder, the request with switching information. The method 600 can include receiving, by a switching logic within the switch, the request and converting, by the switching logic, the request into a local write or read request. The method 600 can include transmitting, by the switching logic, the local write or read request to a first proxy of the first subset of proxies.

When the method 600 is performed in testing/verifying a DUT that is a PCIe component, the first subset of verification components can include a first EP verification component and a second EP verification component. The second subset of verification components can include a first RC component and a second RC component. Configuring the switch can include connecting the first EP component to Type 1 configuration registers and connecting the switch to the first EP component and the first RC component. The enabling the first transaction can include enabling the first transaction between the DUT and the second EP component or the RC component. The first subset of verification components can include a third EP component. The dynamically configuring can include removing, by the configuration transaction manager, the connection between the first EP component and the Type 1 configuration registers, and connecting the third EP component to the Type 1 configuration registers.

The method 600 can include enabling a first transaction between the functional module and the first verification component (604). The switch can enable the first transaction responsive to (or upon/after) the configuring of the switch. The switch can enable the first transaction by establishing/modifying the connections and/or instantiations of the proxies and/or verification components, as discussed herein. The switch can enable the second transaction by routing/directing communications of the second transaction through at least one proxy corresponding to the functional module (DUT) and the first verification component. The switch can enable the first transaction by operating as a bridge, and/or by establishing a communications path through one or more proxies and/or verification components in accordance with a defined protocol (e.g., PCIe). The DUT as an RC component can send write or read transactions via the switch structure to any of the connected EP components. As another example, the DUT as an EP component can respond to an RC component sending the DUT a write or read transaction via the switch structure, or the DUT can send a write or read transaction to the RC component or another EP component via the switch structure.

The method 600 can include dynamically reconfiguring the switch (e.g., at a second time instance) to operate a second subset of proxies to enable a second transaction (606). The user can enter software commands to remove the switch or reconfigure the switch such that the switch structure has a different configuration. For example, the user can start with two RC-EP pairs that are not connected to each other. The user can instantiate a switch and a set of proxies that are connected to each of the verification components of the two RC-EP pairs. The resulting switch structure can include the configuration of FIG. 4B. Then the user can dynamically add and/or remove more RC-EP pairs to add more EP components (or DUTs) to the switch structure. For example, the user can add another RC-EP pair to the switch structure so that the configuration includes the configuration of FIG. 5B. As another example, the user can add another switch and another RC-EP pair to the switch structure so that the configuration includes the configuration of FIG. 5C. Accordingly, the user can add one or more DUTs to the switch structure to test/verify/debug the DUT as an RC component or an EP component.

The method 600 can include enabling the second transaction between the DUT and the second verification component (608). The switch can enable the second transaction responsive to (or upon/after) the (re)configuring of the switch. The switch can enable the second transaction by establishing/modifying the connections and/or instantiations of the proxies and/or verification components, as discussed herein. The switch can enable the second transaction by routing/directing communications of the second transaction through at least one proxy corresponding to the DUT and the second verification component. The switch can enable the second transaction by operating as a bridge, and/or by establishing a communications path through one or more proxies and/or verification components in accordance with a defined protocol (e.g., PCIe). After the DUT is connected to the reconfigured switch structure, the user can test the DUT as an RC component by sending a write and/or read transaction request to one or more EP components. As another example, the user can test the DUT as an EP component by responding to a write and/or read transaction request from an RC component or another EP component.

In some embodiments, the first and/or second transaction can be enabled via third verification component of type 2, the switch, and a fourth verification of type 1. In some embodiments, the first and/or second transaction can be enabled via the third verification component of type 2, the switch, the fourth verification component of type 1, the switch, and a fourth verification component of type 1. In some embodiments, the first and/or second transaction can be enabled via the third verification component of type 2, the switch, and the fourth verification component of type 2.

In some embodiments, the user can test/verify multiple functional designs/components. For example, instead of one DUT, the user can test two or more DUTs. In some embodiments, a first DUT can be an RC component (e.g., verification component 240) and a second DUT can be an EP component (e.g., verification component 242 or 244). The user can test a transaction between the first DUT and the second DUT using the switch.

Figure 7:
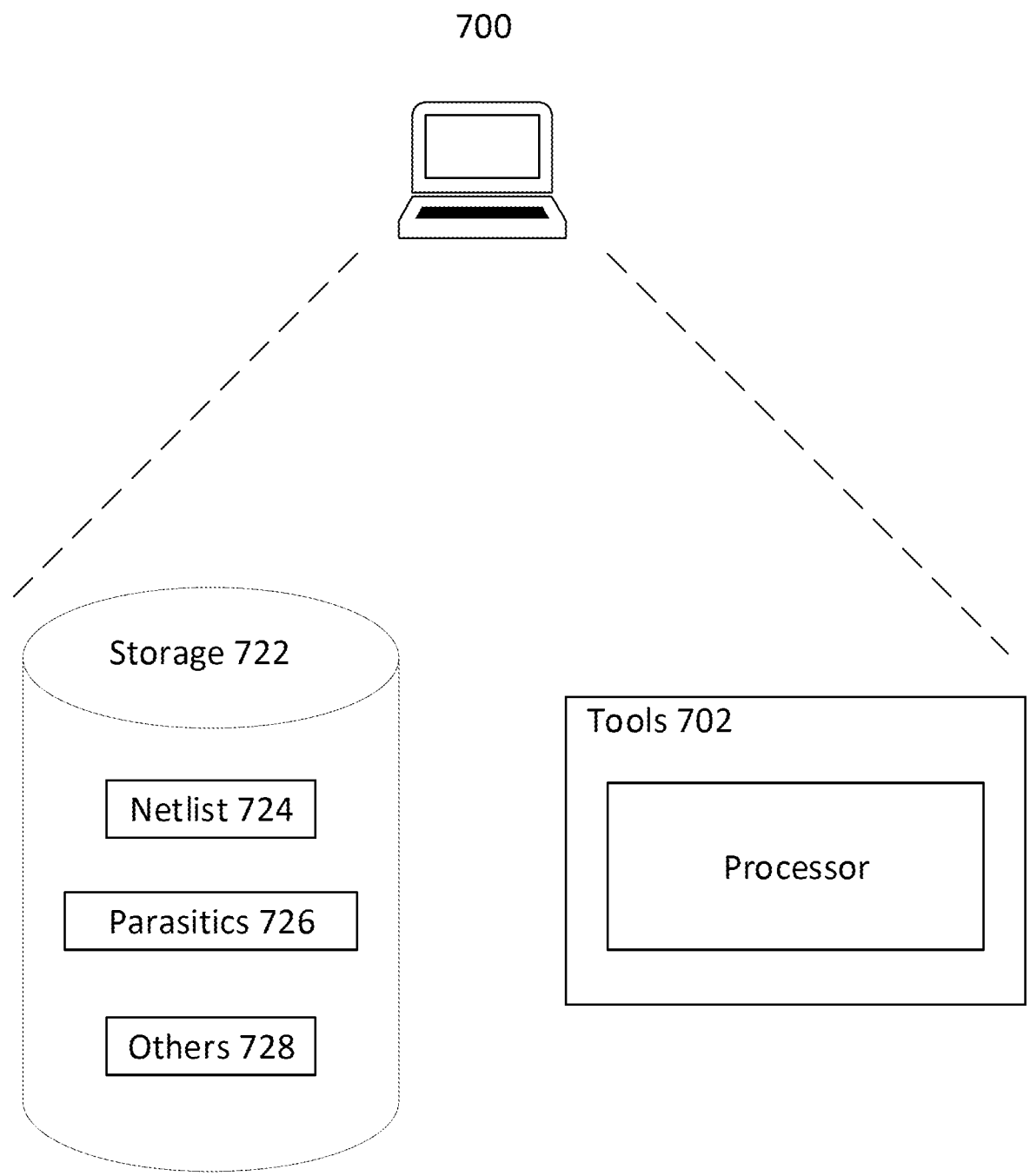
FIG. 7 is a block diagram of an example computing system for implementing a switch, according to some embodiments.

FIG. 7 is a functional block diagram of an example computing system 700 for configuring switches for verification IP, according to the present embodiments. In some embodiments, the system 700 can be one or more computers that are loaded with software (e.g., EDA tools) and/or customized to include hardware for interactively and/or automatically implementing designs of integrated circuits (e.g., ASICs, SOCs, full custom digital ICs). In some embodiments, the one or more computing systems 700 comprise various components not shown such as processor(s) or processor core(s), memory, disks, etc. The software and/or custom hardware may include interactive or automated modules such as a placer, a routing engine, a layout editor, a wire editor, a design rule checker, a verification engine, a module generator, a synthesis tool, a simulator/verification-tool, and/or a floor-planner, as can be appreciated by those skilled in the art.

In one or more embodiments, the computing system 700 may further write to and read from a local or remote volatile or non-volatile computer accessible storage 722 that stores thereon data or information such as, but not limited to, one or more databases such as post-placement layouts, schematic design database(s) or physical design database(s) (e.g., GDS II or OASIS data, etc.), circuit stage credit database 724, libraries, rule decks, constraints (e.g., timing constraints such as required arrival time, etc.), etc. 726, and/or other information or data 728 (e.g., netlists, derates, parasitic data, SDF, etc.) that may be required to support the methodology of the present embodiments. According to certain aspects, the databases and libraries in the storage 722 are extendable or changeable (e.g., via APIs and the like) without changing other components or data in system 700.

In some embodiments, the one or more computing systems are implemented in a "cloud" configuration and/or a client/server configuration. For example, one or more server computers may be loaded with application software (e.g., a router and/or other EDA tool) for implementing some or all of the methodology of the present embodiments, and one or more client computers can communicate with the server computer(s) via a network to perform some or all of the methodology of the embodiments for a particular design.

In some embodiments, the one or more computing systems 700 may, by various standalone software, hardware modules or combinations thereof 702 (e.g., EDA tool), include a processor 116 that executes the processes and approaches discussed above to configure or dynamically reconfigure a switch for emulation with verification IP. The processor 116 can execute the method 600 and approaches discussed above in relation to FIGS. 1-6. The processor 116 may be implemented by adapting or communicating with certain pre-existing modules (e.g., design workflow, design timing, design optimization, design sign-off, etc.) as may be required to implement a methodology to creating and configuring switches for protocols to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. An emulator system configured to emulate functionalities of an integrated circuit design, the emulator system comprising:
   at least one processor;
   a plurality of verification components each comprising circuitry configured to perform transactions with at least another one of the verification components;
   a plurality of proxies, each executing on the at least one processor and corresponding to a respective one of the verification components;
   a switch executing on the at least one processor and communicatively coupled with the proxies, the switch dynamically configurable to:
      at a first time instance, operate with a first subset of the proxies to enable a first transaction between a functional module of the integrated circuit design and a first one of the verification components, and
      at a second time instance, operate with a second subset of the proxies to enable a second transaction between the functional module and a second one of the verification components.

2. The emulator system of claim 1, wherein the plurality of verification components includes a first subset of verification components each of a first type, and a second subset of verification components each of a second type.

3. The emulator system of claim 2, wherein the first or second transaction is enabled via: a third verification component of the second type, the switch and a fourth verification component of the first type.

4. The emulator system of claim 2, wherein the first or second transaction is enabled via: a third verification component of the second type, the switch, a fourth verification component of the first type, the switch, and a fifth verification component of the first type.

5. The emulator system of claim 2, wherein the first or second transaction is enabled via: a third verification component of the second type, the switch and a fourth verification component of the second type.

6. The emulator system of claim 2, wherein the first or second transaction is enabled via the switch.

7. The emulator system of claim 2, wherein the first or second transaction is directly between the functional module and the first or second verification component.

8. The emulator system of claim 1, wherein the switch comprises:
   a transaction responder configured to receive a request to enable the first transaction, and output the request with switching information; and
   switching logic configured to receive the request and the switching information from the transaction responder, convert the request into a local write or read request, and transmit the local write or read request to a first proxy of the first subset of the proxies.

9. The emulator system of claim 1, further comprising another switch executing on the at least one processor and communicatively coupled with the switch and the proxies.

10. The emulator system of claim 9, wherein the another switch is dynamically configurable to:
at a third time instance, operate with a third subset of proxies to enable a third transaction between the functional module and a third one of the verification components; and
at a fourth time instance, operate with a fourth subset of proxies to enable a fourth transaction between the functional module and a fourth one of the verification components.

11. The emulator system of claim 1, wherein the first and second verification components each comprises a peripheral component interconnect express (PCIe) root complex verification component or a PCIe endpoint verification component.

12. A method for emulating functionalities of an integrated circuit design, comprising:
configuring a switch executing on at least one processor and communicatively coupled with a plurality of proxies executing on the at least one processor, to operate with a first subset of the proxies to enable a first transaction between a functional module of the integrated circuit chip design and a first one of a plurality of verification components, wherein each of the verification components comprises circuitry configured to perform transactions with at least another one of the verification components, and wherein each of the proxies corresponds to a respective one of the verification components;
enabling, by the switch and the first subset of the proxies, at a first time instance responsive to the configuring, the first transaction between the functional module and the first one of the verification components;
dynamically configuring the switch to operate with a second subset of the proxies to enable a second transaction between the functional module and a second one of the verification components; and
enabling, by the switch and the first subset of the proxies, at a second time instance responsive to the dynamically configuring, the second transaction between the functional module and the second one of the verification components.

13. The method of claim 12, wherein the plurality of verification components includes a first subset of verification components each of a first type and a second subset of verification components each of a second type.

14. The method of claim 13, wherein the first and second transactions are enabled via:
a third verification component of the second type, the switch, a fourth verification component of the first type;
the third verification component of the second type, the switch, the fourth verification component of the first type, the switch, and a fifth verification component of the first type; or the third verification component of the second type, the switch, and the fourth verification component of the second type.

15. The method of claim 13, wherein:
the first subset of verification components includes a first peripheral component interconnect express (PCIe) endpoint verification component, and
the configuring the switch comprises connecting, by a configuration transaction manager, the first PCIe endpoint verification component to PCIe Type 1 configuration registers.

16. The method of claim 15, wherein:
the first subset of verification components further includes a second PCIe endpoint verification component,
the second subset of verification components further includes first and second PCIe root complex verification components,
the configuring the switch further comprises connecting the switch to the first PCIe endpoint verification component and the first PCIe root complex verification component, and
the enabling the first transaction comprises enabling the first transaction between the functional module and the second PCIe endpoint verification component or the second PCIe root complex verification component.

17. The method of claim 16, wherein the first subset of verification components further includes a third PCIe endpoint verification component, and the dynamically configuring comprises:
removing, by the configuration transaction manager, the connection between the first PCIe endpoint verification component and the PCIe Type 1 configuration registers; and
connecting, by the configuration transaction manager, the third PCIe endpoint verification component to the PCIe Type 1 configuration registers.

18. The method of claim 12, further comprising:
receiving, by a transaction responder within the switch, a request to enable the first transaction; and
outputting, by the transaction responder, the request with switching information.

19. The method of claim 18, further comprising:
receiving, by a switching logic within the switch, the request;
converting, by the switching logic, the request into a local write or read request; and
transmitting, by the switching logic, the local write or read request to a first proxy of the first subset of proxies.

20. The method of claim 12, wherein:
the functional module includes a first functional module and a second functional module, and
the enabling the first transaction comprises enabling the first transaction between the first functional module and the second functional module via the switch.

* * * * *